Sept. 30, 1958 N. P. SCHUTZ ET AL 2,853,824
SUBMARINE ECHO-SOUNDING APPARATUS FOR FISHING VESSELS
Filed Sept. 19, 1955 4 Sheets-Sheet 1
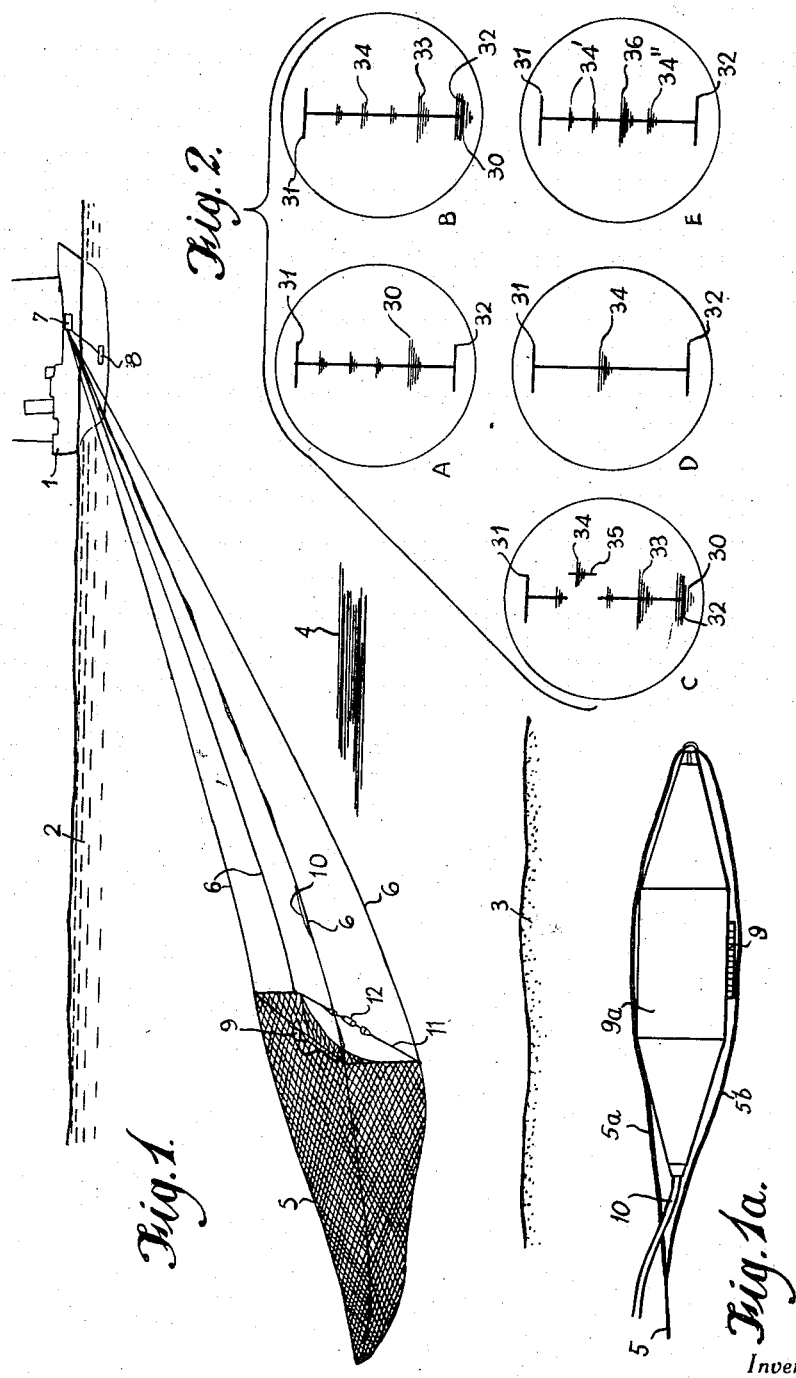
Inventor
NICOLAS P. SCHUTZ
RALPH W. WOODGATE
By
Holcombe, Wetherill & Brisebois
Attorney Sept. 30, 1958   N. P. SCHUTZ ET AL   2,853,824
SUBMARINE ECHO-SOUNDING APPARATUS FOR FISHING VESSELS
Filed Sept. 19, 1955   4 Sheets-Sheet 2

Inventor
NICOLAS P. SCHUTZ
RALPH W. WOODGATE
By
Holcombe, Wetherill & Brisebois
Attorney

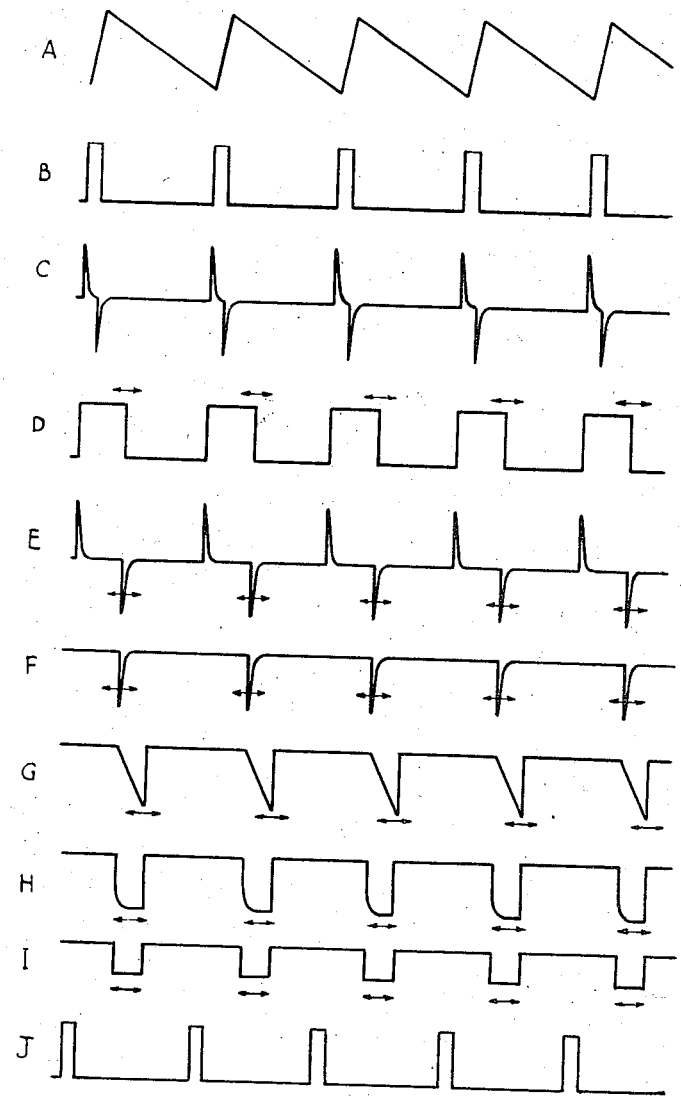

United States Patent Office 2,853,824
Patented Sept. 30, 1958

2,853,824

SUBMARINE ECHO-SOUNDING APPARATUS FOR FISHING VESSELS

Nicolas Pierre Schutz, Lille, France, and Ralph William Woodgate, London, England, assignors to Pye Marine Limited, London, England, a British company, and Societe Generale d'Electricite et de Radio, Faches Thumesnil, France, a French body corporate Application September 19, 1955, Serial No. 539,541

16 Claims. (Cl. 43—17.1)

The present invention relates to submarine echo-sounding apparatus for use in fishing.

Submarine echo-sounding apparatus operating at audio or ultrasonic frequencies has been employed for several years in detecting shoals of fish and locating their position relative to the sea bed, and by means of the information provided the skipper of the fishing vessel adjusts the position of his trawl net. Hitherto, however, it has not been possible to locate the position of the trawl relative to the surface of the sea or to the sea bed with very great accuracy, and consequently the fish which have been located by the echo-sounding apparatus may be missed by reason of the trawl floating either too high or too low. The difficulties of catching the fish are increased by reason of the fact that the opening of the trawl net may, due to under water currents, be reduced. As the trawl is dragged at perhaps 300 to 500 yards behind the fishing vessel and is, of course, out of sight below the surface of the sea, the skipper has no means of knowing how accurately his trawl has been positioned with respect to the shoal of fish indicated on the echo-sounding apparatus until the trawl is drawn in and the actual catch can be visibly inspected.

The present invention has for its object to provide means whereby the trawl net can be more accurately positioned in the sea with respect to the shoal of fish indicated by the echo-sounding apparatus whereby a better catch may be obtained.

A further object in the invention is to provide improved submarine echo-sounding apparatus whereby the position of the fish and the kind of fish will be more accurately and readily indicated by the echo-sounding equipment.

According to the present invention, a transducing equipment comprising means for transmitting an audio or ultrasonic signal, and means for receiving the echo of said signal, are mounted on or in the fishing or trawl net itself and connected to the echo-sounding control and indicating equipment located on board the ship whereby, by effecting echo-sounding operations by using the transducing equipment attached to the net, the actual depth to which the net is submerged or its distance from the sea bed will be indicated on the ship. The skipper is thus able accurately to position his net with respect to the shoal of fish which may be detected by using the transducing equipment mounted on the trawl or by transducers carried on the fishing vessel in the conventional manner. The echoes received by the ship and net transducers are simultaneously or alternatively reproduced on the echo-sounding indicating or recording equipment located in the ship. In use the ship transducers are first used to indicate the presence of a shoal of fish and its depth or relation with respect to the sea bed, the transducing equipment associated with the net then being used to indicate the depth of the net which may be adjusted in accordance with the known fishing techniques to correspond with the depth of the shoal of fish which has been located.

According to a feature of the invention, means are provided for producing a magnified indication of the echoes received by the transducing equipment in the net, for example so as to cover only a few fathoms including the net opening, and giving an indication of the actual net opening, whereby the echo-sounding apparatus will more clearly indicate, during the fishing operation, that the fish are actually passing through the net opening and into the net. If the indications show that the net opening is not correctly positioned with respect to the shoal, the position of the net can be easily adjusted to achieve the maximum catch.

On account of the length of cable between the ship and the transducing equipment in the net, the transmitted signals should comprise pulses of continuous wave energy at audio or ultrasonic frequencies in order that energy losses in the cable may be reduced to a minimum. Furthermore, in view of the short distances which have to be measured, the production of the transmitted pulses from the transducers and the time base equipment should be controlled electronically in order to reduce synchronisation errors to a minimum, and the pulses should also be of short duration compared with the propagation time in water of the nearest echoes.

The echoes may be recorded on known recording equipment but are preferably indicated on one or more cathode ray tubes. By reason of the low speed of propagation of sound through water, and the fact that the echo-sounding equipment must be capable of measuring depths up to 300 to 400 fathoms, the repetition rate of the scanning trace on previously known echo-sounding equipment using cathode ray tube indicating means has been quite slow and the indications are produced by a series of slow flashes which necessitates the use of a tube screen having a long decay time. Even so, the indications given on the screen are not as clear as would be obtained if the repetition rate of the scanning trace were increased. Although the equipment must be capable of effecting soundings up to 300 or 400 fathoms, most fishing grounds do not have a depth exceeding about 100 fathoms. According to a feature of the invention, the scanning time base is produced by an oscillator having a frequency which is continuously variable over a range corresponding to the range of depths to be sounded, whereby the equipment can be adjusted to produce the maximum possible sounding rate for the depth of water in which the vessel is fishing.

The oscillator frequency is adjusted so that the echo of the sea bed occurs at the end of the scanning trace whereby a maximum length of trace is used and the repetition rate is the maximum possible for the depth concerned, which consequently produces a brighter and clearer picture enabling the echo-signals to be more easily identified. Furthermore, the secondary echoes which occur are always produced at substantially the same position on the trace for a given oscillator frequency, instead of at varying positions therealong, whereby it becomes more easily possible to recognise secondary echoes and not to mistake them for shoals of fish which do not exist.

The adjustment of the oscillator frequency is preferably controlled by a knob or other control device associated with a scale which may be calibrated in depth. Thus, when the "bottom" echoes are aligned with a mark on the cathode ray screen, the calibrated scale gives an indication of the depth of the sea bed.

Since the "scale" of the trace will vary with the oscillator frequency, a feature of the invention consists in deriving a marker signal from the variable frequency oscillator through a variable time delay circuit and indicating this marker signal on the cathode ray tube trace, for example, either by a brightening of the trace or a deflection of a part thereof. By varying the delay, the marker signal may be caused to move along the trace and by calibrating the control member of the delay device in depth, a ready indication of the depth of any particular echo is given when the marker signal is aligned therewith. Since the delayed marker signal is derived from the variable frequency oscillator, any variation of the oscillator frequency automatically varies the position of the marker signal along the trace corresponding to the adjusted oscillator frequency so that the calibrations of the time delay control member remain accurate irrespective of variations of the oscillator frequency.

The output from the delay network used for producing the marker signal may also be employed for producing a high speed time base covering only a short sounding range, for example, seven fathoms, so that by applying this high speed time base, either on the same or a different cathode ray tube, a magnified indication of the signals occurring within this sub-range of the total adjusted sounding depth (the commencement of which sub-range coincides with the commencement of the marker signal) will be indicated on the tube. The magnified sub-range may be varied by changing the position of the marker signal by varying the delay control. The marker signal preferably lasts for a duration corresponding to the range of the high speed time base.

Switching means may be provided for reproducing the echoes received by the transducing equipment on the net on the high speed sweep. In this case, the delay time should be reduced to zero so that the magnified image will be of the sub-range extending from the transducing equipment in the net and include the net opening. In order to avoid the necessity of manually turning the delay back to zero when switching over from the inboard transducers to a magnified image of the net transducers, the switching operation or operations may automatically short-circuit or by-pass the delay network or may, alternatively, produce transmission pulses timed with the commencement of the high-speed sweep.

In order that the invention may be more clearly understood, reference will now be made to the accompanying drawings in which—

Figs. 1 and 1a indicate the general arrangement of echo-sounding equipment according to this invention.

Fig. 2 shows various echo indications as they may appear on the cathode ray tube.

Fig. 5 shows waveform diagrams.

Figures 3, 3A:
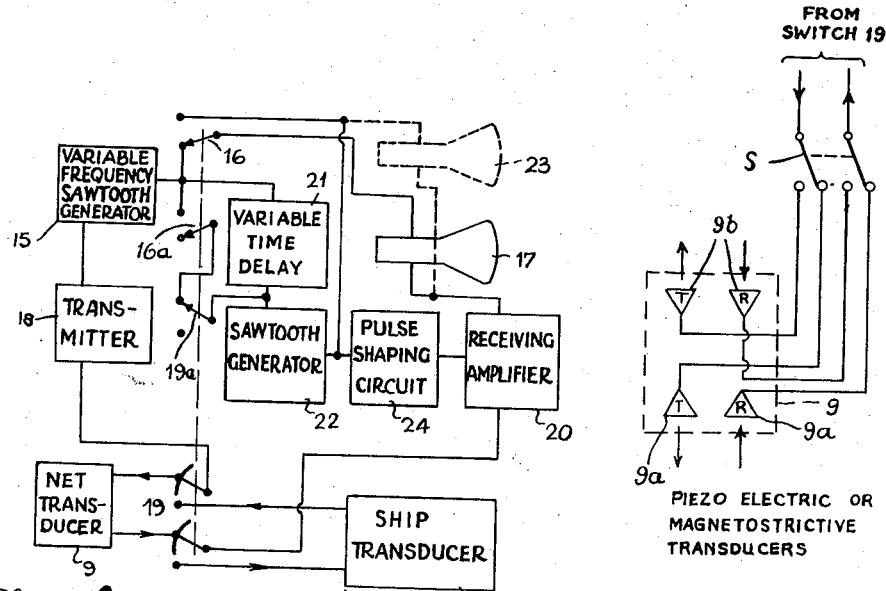
Figs. 3 and 3a show diagrammatically the arrangement of the sounding equipment.

Referring to Figure 1, 1 represents a fishing vessel floating on the surface 2 of the sea. The sea bed is represented at 3 and a shoal of fish at 4. 5 is the trawl net which is dragged in conventional manner some distance behind the ship by drag lines 6. On board the ship is the control and indicating equipment 7 which can be connected to the transducer 8 carried by the hull of the ship in known manner. A further transducer 9 is carried in the trawl net 5 and is connected to the equipment 7 on board the ship by a cable 10 which may be incorporated in the drag line 6 or may be payed out separately. The equipment 7 on board the ship is connectable either simultaneously or alternatively to the transducers 8 and 9 by switches as will be more fully hereinafter explained.

The transducer 9 in the trawl net may be arranged to transmit ultrasonic pulses either downwardly towards the sea bed or upwardly towards the surface of the sea. In the former case the transducer 9 is preferably carried, as shown in Figure 1, at the top of the trawl net so that an echo will be produced from the bottom of the trawl net opening for which purpose an additional rope 11 carrying rings 12 of sufficient size to give a reliable echo may be arranged across the front bottom edge of the trawl net. The transducer 9 may be secured to the net 5 between two layers 5a and 5b of the net and may be enclosed in a semi-buoyant casing 9a in order not to upset the balance of the net.

In the case where the transducer 9 is arranged to project pulses upwardly, it is preferably carried in the bottom of the net, the rings 12 then being affixed to the top of the net, so that the net opening will again be indicated.

If desired as shown in Figure 3a, the transducer 9 may incorporate two sets of transmitting and receiving units 9a and 9b arranged respectively for sounding downwardly and upwardly, switch means S being provided on board the ship for enabling the direction of sounding to be selected. The transducing equipment may comprise separate transmitting and receiving elements T and R, as shown, or a combined transmit-receive-transducer as known in the art may be employed. The transducers may be of any convenient type, for example, piezo-electric (crystals or ceramic) or magnetostrictive.

The electronic control and indicating equipment is diagrammatically illustrated in Figure 3 and comprises a variable frequency saw-tooth generator 15, the output saw-tooth waveform being applied through the switch 16 as a time base to the indicating cathode ray tube 17. The output from the saw-tooth generator 15 is also fed to trigger a pulse transmitter 18 which generates pulses of continuous wave energy, for example pulses of 30 kc. energy. The output from the transmitter 18 is fed through the switch 19 to either or both the ship transducer 8 and the net transducer 9. The echoes received on the transducers 8 and 9 are fed also through the switch 19 to the receiving amplifier 20 and thence to the cathode ray tube 17.

The variable frequency saw-tooth generator frequency is also fed through a variable delay network 21 to trigger a high speed time base 22, which may be selectively applied to the cathode ray tube 17 by the switch 16. It may additionally or alternatively, be applied to a second cathode ray tube 23. The output from the delayed time base 22 is fed through a pulse shaping circuit 24 to produce a marker signal which is fed to the receiving amplifier 20 so that it will be superimposed on the reproduced signal by deflecting the corresponding portion of the trace where the marker signal occurs. The duration of the marker signal will correspond to the time sweep of the high speed time base. Thus, by varying the time delay introduced by the delay network 21, the marker pulse can be caused to move along the trace reproduced on the cathode ray tube, and the high speed time base will occur during the same interval.

In operation, the ultrasonic pulses are first transmitted through the ship transducer 8 and provided that the variable frequency oscillator 15 is adjusted for a sounding range greater than the depth of the sea, the echoes of the sea bed will appear part-way along the trace, as shown at 30 in Figure 2a. 31 is the starting line of the trace and 32 is a mark on the cathode ray tube screen indicating the end of the trace. The frequency of the oscillator 15 is then increased until the bottom echoes 30 coincide with the line 32, as indicated in Figure 2b. Under these conditions, the maximum possible sounding rate for the depth in question is obtained, and all secondary echoes will occur at a substantially fixed position 33 for that oscillator frequency instead of being disposed at different points along the trace. Other echoes will occur, for example, as at 34 corresponding to fish or other obstacles in the water and by reason of the scanning speed being the maximum possible for the depth in question, the maximum clarity of the echoes will be produced which facilitates identification of the kinds of fish located. The depth of the sea bed is indicated on the calibrated scale associated with the control member of the oscillator 15.

To indicate the depth of any particular echo, the marker signal is impressed on the cathode ray tube so as to deflect a porton of the trace as shown at 35 in Figure 2c. The portion which is deflected can be varied by adjusting the time delay network 21, and when the marker signal is aligned with any particular echo, the depth will be indicated on the calibrated scale associated with the control member of the time delay network 21. The length of the marker signal corresponds, in the example being considered, to a distance of seven fathoms.

By changing over the switch 16, a magnified image of the seven fathom sub-range selected by the marker signal will be reproduced on the cathode ray tube screen, as indicated in Figure 2d, so as to enable even clearer identification of the echoes to be obtained.

When a shoal of fish has been located in the manner above described, the switch 19 is operated to change over from the ship transducer 8 to the net transducer 9, and the depth to which the trawl is submerged can then be accurately adjusted by measuring the distance between the net transducer 9 and the sea bed. This can be effected by adjusting the oscillator 15 to a depth corresponding to the distance between the located echo and the sea bed and adjusting the depth to which the trawl is submerged, by known fishing techniques, until the "bottom" echoes indicated by the sounding equipment from the transducer 9 are aligned with the line 32 on the cathode ray tube screen. Switch 16 is then operated to give a magnified picture on the screen, and since the sub-range required to be magnified is that extending for seven fathoms below the transducer 9, the time delay circuit 21 must be restored to zero in order that this range may be indicated on an enlarged scale. This may be effected manually. Alternatively, the changing over of the switch 16 to "magnified" image, when the switch 19 is connected to the transducer 9, may be arranged so as automatically to shortcircuit or by-pass the time delay network 21 (as indicated by the contacts 16a and 19a in Fig. 3) so that manual readjustment of the time delay network will be unnecessary. The image then obtained on the screen will be similar to that shown in Fig. 2(e) where 36 represents the echo of the bottom of the net, 34' fish entering the net, and 34" fish which are not being caught.

Figure 6:
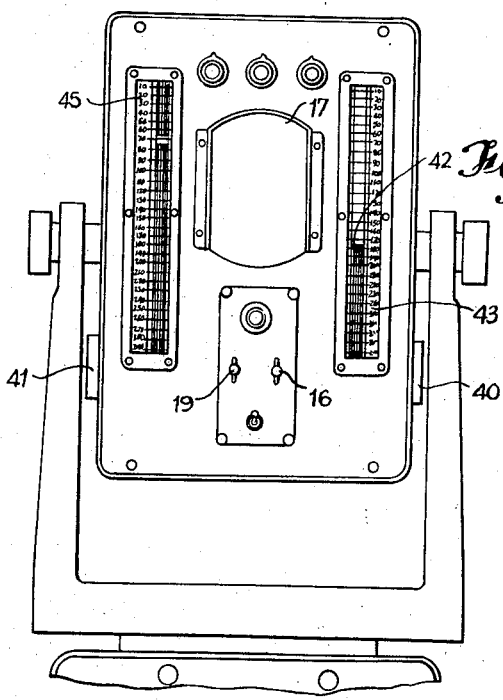
Fig. 6 shows a front view of the control and indicating equipment of the echo-sounding apparatus.

For the convenience of operation, the calibrated scales associated with the controls of the oscillator 15 and the time delay network 21 are preferably arranged to extend vertically at opposite sides of the cathode ray tube screen. This is indicated in Figure 6, which shows an end view of the cabinet enclosing the control and indicating equipment. The control knob for the oscillator 15 is indicated at 40 on the right-hand side of the cabinet and the control knob for the delay network is indicated at 41 on the left-hand side. Operation of the knob 40 actuates an index mark 42 against the vertical scale 43 and for ease of viewing the index mark is preferably constituted by a dividing line between white and dark areas on a belt which moves against the scale 43. The white area thus indicates the sea depth and gives a ready indication. A similar belt may be actuated by the knob 41 and move in conjunction with the scale 45 but in this case the index marking preferably comprises a white band, corresponding to a depth of 7 fathoms, on a dark tape.

Figure 4:
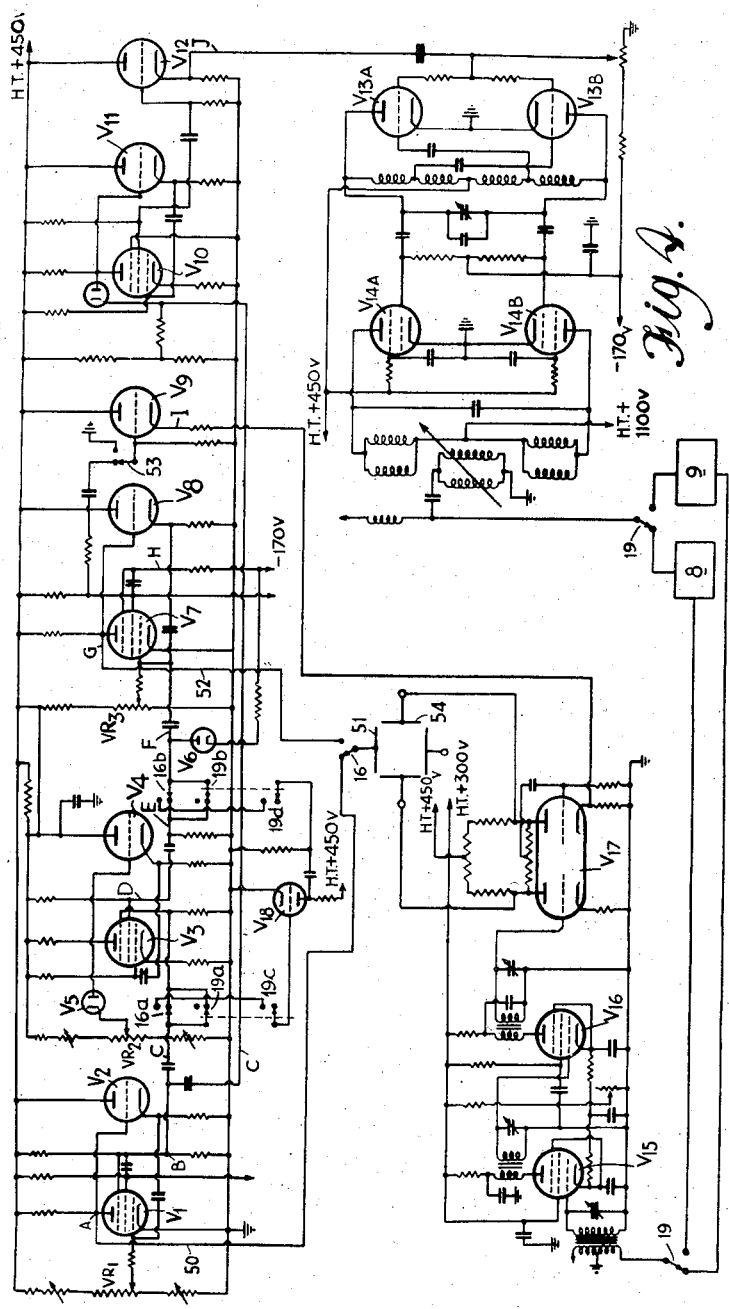
Fig. 4 shows a detailed circuit arrangement.

One particular circuit arrangement of the electronic equipment will now be described with reference to Figure 4. Figures 5(A) to 5(J) show diagrams of the waveforms at the various parts of the circuit indicated by the reference characters A—J respectively.

The variable frequency sawtooth generator 15 comprises a pentode valve V1 and triode valve V2, the frequency being varied by means of the variable resistor VR1. The sawtooth waveform, Fig. 5(A), produced at the anode of valve V1 is fed through conductor 50 to the vertical deflecting electrodes 51 of cathode-ray tube 17 via switch 16 to produce the main time base trace. An output is also taken from the screen grid of valve V1, consisting of a series of pulses as shown in Figure 5(B), and fed through a differentiating circuit to produce a series of differentiated pulses as shown in Figure 5(C) which are applied to the suppressor grid of a pentode valve V3. The valve V3 together with a triode valve V4 forms a phantastron arrangement constituting the delay network 21. The period of delay produced by the phantastron 21 is varied by the potentiometer VR2, the slider of which is connected to the anode of pentode V3 through a diode V5. The phantastron delay circuit 21 produces a series of square pulses of variable width as shown in Figure 5(D), which are derived from the screen of V3 and fed through a differentiating circuit to produce the waveform shown in Figure 5(E), and through a clipping circuit including diode V6 which clips off the positive differentiated pulses to produce the waveform shown in Fig. 5(F). The negative pulses of Fig. 5(F) are fed to the grid of a pentode valve V7 which together with the triode valve V8 forms the sawtooth generator 22. The sawtooth voltage, Fig. 5(G), produced at the anode of pentode V7 is fed through conductor 52 to switch 16 by which it may be selectively applied to the vertical deflecting plates 51 to produce a high-speed sweep on the cathode-ray tube 17. The speed of the time base generator 22 can be adjusted by the variable resistance VR3 which is normally pre-set to provide the desired range, for example 7 fathoms. A pulse having a time duration equal to the duration of a sawtooth is also derived from the screen of valve V7, as shown in Figure 5(H), and applied through a clipping and squaring circuit comprising a triode valve V9 to produce the squared marker signal pulses, shown in Figure 5(I), which are applied through valve V17 to the horizontal deflector plates 54 of the cathode ray tube. The marker pulse can be switched off by the switch 53. The output pulse from the screen of valve V7 may also be applied through connection 55 to the grid of the cathode ray tube 17 to produce a brightening of the scanning beam during the period of the marker signal.

The output pulse from the screen of valve V1 in the sawtooth generator 15 is also applied through the pulse generating circuit comprising pentode valve V10 and triode V11 to produce the positive going transmitter trigger pulses each of about one microsecond duration, as shown in Figure 5(J). These trigger pulses are fed through a cathode-follower V12 to a 30 kc. oscillator consisting of push-pull 30 kc. oscillator V13A and V13B driving a push-pull power amplifier stage V14A, V14B, the output of which, comprising pulses of 30 kc. continuous wave energy, is fed via a transformer and the switch 19 to the transmitting transducers 8 and 9.

Echo signals received on the receiving transducers 8 and 9 are amplified by the receiver and amplifying unit 20 comprising pentode valves V15, V16 and a double triode V17, and applied to the horizontal deflecting plates 54 of the cathode ray tube 17.

To produce on the cathode ray tube a magnified image of the echoes obtained by the net transducer over a sub-range extending for seven fathoms from the net transducer, it is necessary that the transmission pulses should be synchronised with the commencement of the high-speed sweep. This can be effected by manually adjusting the time delay control VR2 back to "zero" delay. According to a feature of the invention, the synchronisation of the transmitted pulses with the commencement of the high-speed sweep is automatically effected when the switches 16 and 19 are operated to produce a "magnified net" image. This is achieved with the circuit illustrated in Figure 4 by providing the switches 16 and 19 with additional contact arms 16a, 16b and 19a, 19b, 19c and 19d respectively. When the switch 16 is in the "unmagnified" position, the arms 16a and 16b will be as shown in the figure, and when the switch 16 is moved to "magnified" position these two arms will be raised to their upper positions. Similarly the arms 19a, 19b, 19c and 19d will be in their lower positions as shown in Figure 4 when the switch 19 is connected to the ship transducer 8 and will be raised when the switch 19 is moved to the net transducer 9. The switch arms 16a, 19a and 16b, 19b respectively are connected in parallel so that operation of only one of the switches will not alter operation of the circuit as previously described. If both switches 16 and 19 are operated, the differentiated waveform of Figure 5(C) will be fed through the phase reversing valve V18 and the phase reversed pulses will be applied directly to trigger the time base 22. The valve V6 suppresses the positive going peaks as previously so that the time base 22 will be triggered by the negative going peaks corresponding to the leading edges of the sawtooth waveform generated by the oscillator 15 and will be synchronised with the transmission pulses.

Whilst a particular embodiment has been described, it will be understood that various modifications may be made without departing from the scope of the invention as defined by the appended claims. Thus, for fishing in very deep waters, where echoes from the sea bed cannot be obtained, the net transducer should be arranged to transmit the ultrasonic pulses upwardly to obtain a reflection from the surface of the sea and thus an indication of the depth to which the net is submerged. In this case the net transducer should be mounted in the bottom of the net so that an indication of the net opening will also be obtained.

Furthermore instead of cutting the delay network 21 out of circuit when switching to "magnified net" image in order to obtain an indication of the sub-range extending from the net transducer, the same result may be achieved by causing the time base 22 to trigger the transmission pulses so that in effect the transmission pulses will be delayed in time to synchronise with the commencement of the high-speed time base.

We claim:

1. Submarine echo sounding apparatus for use in fishing, comprising means for generating a series of pulses of ultrasonic continuous wave energy, an echo-indicating device, a time base generator operating in timed relation with and fed from said pulse generator, means for representing a time base from said time base generator on said echo indicating device, a fishing net, transducing means fed from said pulse generator for transmitting ultrasonic sounding pulses and for receiving echo signals thereof mounted on said fishing net means for feeding said received echo signals to said echo-indicating device, and means for producing on said echo-indicating device a magnified indication of the echo signals received by the net transducing means and covering a part of the sounding range of said transducers which includes the net opening.

2. Apparatus as claimed in claim 1, wherein the net transducing means is mounted at the top of a fishing net consisting of a trawl net and adjacent the front opening thereof in a manner to effect soundings in a downward direction and so that an echo signal will be obtained from the bottom of the net opening.

3. Apparatus as claimed in claim 1, wherein the net transducing means is mounted at the bottom of a fishing net consisting of a trawl net and adjacent the front opening thereof in a manner to effect soundings in an upward direction and so that an echo signal will be obtained from the top of the net opening.

4. Apparatus as claimed in claim 1, in which echo-producing means are provided adjacent one edge of the net opening thereby affording an indication of position of said edge of the opening.

5. Submarine echo-sounding apparatus for use in fishing, comprising means for generating a series of pulses of ultrasonic continuous wave energy, an echo-indicating device, a time base generator connected to said echo-indicating device and operating in timed relation with and fed from said pulse generator, means for feeding received echo signals to said indicating device, a fishing net, transducing means fed from said pulse generator for transmitting ultrasonic sounding pulses and for receiving echo signals thereof mounted on said fishing net, and means included in said sounding and indicating equipment for producing a magnified indication of the echoes received by the transducing means and covering a part of the sounding range of said transducing means which includes the opening into the fishing net of said transducing means.

6. Submarine echo-sounding apparatus for use in fishing, comprising means for generating a series of pulses of ultrasonic continuous wave energy, a time base generator operating in timed relation with said pulse generating means, a cathode ray tube, means connecting the time base generator to the cathode ray tube for displaying a time base on said cathode ray tube, a fishing net, transducing means mounted on said fishing net and connected to said pulse generator for transmitting said ultrasonic sounding pulses and for receiving echo-signals thereof, means for feeding said echo signals to said cathode ray tube, means for displaying said echo signals on said time base and means for producing a magnified indication of the echoes received by the transducing means covering part of the sounding range of the transducing means which includes the opening into said fishing net.

7. Apparatus as claimed in claim 6, wherein the transducing means mounted on the fishing net comprises transducers for effecting soundings both upwardly and downwardly, switch means being provided for selecting the direction of sounding.

8. Submarine echo-sounding apparatus for use in fishing, comprising sounding control and indicating equipment adapted to be mounted on board a fishing vessel, a fishing net, transducing means for transmitting ultrasonic sounding pulses and for receiving echo-signals thereof mounted on said fishing net, means connecting said transducing means to said sounding control and indicating means, and said sounding control and indicating means including a cathode-ray tube, means for generating a series of pulses of ultrasonic energy, a variable frequency time base generator feeding said cathode-ray tube and controlling said pulse generator, means for varying the frequency of said time base generator over a range corresponding to the range of depth to be sounded, and a control member calibrated in depth for controlling the frequency varying means, whereby when an echo signal is aligned with a fixed mark associated with the cathode ray tube screen the depth of the object producing the echo will be given by the indicated setting of said control member.

9. Submarine echo-sounding apparatus for use in fishing, comprising sounding control and indicating equipment adapted to be mounted on board a fishing vessel, transducing means for transmitting ultrasonic sounding pulses and for receiving echo-signals thereof and adapted for mounting on a fishing net, means connecting said transducing means to said sounding control and indicating means, and said sounding control and indicating means including a cathode ray tube, means for generating a series of pulses of ultrasonic energy, a variable frequency time base generator, feeding said cathode-ray tube and controlling said pulse generator and means for varying the frequency of said time base generator over a range corresponding to the range of depth to be sounded.

10. Apparatus as claimed in claim 9, wherein the net transducing means is mounted at the top of a trawl net and adjacent the front opening thereof in a manner to effect soundings in a downward direction and so that an echo signal will be obtained from the bottom of the net opening.

11. Apparatus as claimed in claim 9, wherein the net transducing means is mounted at the bottom of a trawl net and adjacent the front opening thereof in a manner to effect soundings in an upward direction and so that an echo signal will be obtained from the top of the net opening.

12. In submarine echo-sounding apparatus for use in fishing, a control and indicating equipment comprising a variable frequency time base generator, a cathode ray tube, means for feeding the output of said time base generator to produce a trace on said cathode ray tube, means for generating pulses of ultrasonic continuous wave energy, means for triggering said pulse generator from said time base generator, transducing means adapted for mounting on a fishing vessel and on a fishing net for transmitting ultrasonic sounding pulses and for receiving echo signals of said pulses, means for energising said transducing means from said pulse generator, means for amplifying the received echo signals and displaying them on the time base trace on said cathode ray tube, a delay network having a variable delay period fed from the variable frequency time base generator, a high speed time base generator fed from the output of the delay network, means for producing a marker signal from the high speed time base signal and for displaying said marker signal on the trace on said cathode ray tube, and means for cancelling out the delay produced by said delay network when it is desired to reproduce on the cathode ray tube a trace on the high speed time base of the echo signals received by the transducing means mounted on the fishing net.

13. Apparatus as claimed in claim 12, in which echo-producing means are provided adjacent one edge of the net opening thereby affording an indication of position of said edge of the opening.

14. In submarine echo-sounding apparatus for use in fishing, a control and indicating equipment comprising a variable frequency time base generator, a cathode ray tube, means for feeding the output of said time base generator to produce a trace on said cathode ray tube, means for generating pulses of ultrasonic continuous wave energy, means for triggering said pulse generator from said time base generator, transducing means transmitting ultrasonic sounding pulses and for receiving echo signals of said pulses means for energising said transducing means from said pulse generator, means for amplifying the received echo signals and displaying them on the time base trace on said cathode ray tube, a delay network having a variable delay period fed from the variable frequency time base generator, a high speed time base generator fed from the output of the delay network, means for producing a marker signal from the high speed time base signal and for displaying said marker signal on the trace on said cathode ray tube, means for feeding the high speed time base to produce a trace on said cathode ray tube, means for cancelling out the delay produced by said delay network when it is desired to reproduce a trace on the high speed time base of the echo signals received by the transducing means mounted on the fishing net and switch means for selectively connecting said time base and said high speed time base to said cathode ray tube.

15. In submarine echo-sounding apparatus for use in fishing, a control and indicating equipment comprising a variable frequency time base generator, a control calibrated in depth for varying the frequency of said time base, a cathode ray tube, means for feeding the output of said time base generator to produce a trace on said cathode ray tube, means for generating pulses of ultrasonic continuous wave energy, means for triggering said pulse generator from said time base generator, transducing means adapted for mounting on a fishing vessel and on a fishing net for transmitting ultrasonic sounding pulses and for receiving echo signals of said pulses, means for energising said transducing means from said pulse generator, means for amplifying the received echo signals and displaying them on the time base trace on said cathode ray tube, a delay network having a variable delay period fed from the variable frequency time base generator, a control member bearing calibrations representing depth for varying the period of said delay, a high speed time base generator fed from the output of the delay network, means for producing a marker signal from the high speed time base signal and for displaying said marker signal on the trace on said cathode ray tube, means for feeding the high speed time base to produce a trace on said cathode ray tube, means for cancelling out the delay produced by said delay network when it is desired to reproduce a trace on the high speed time base of the echo signals received by the transducing means mounted on the fishing net, switch means for selectively connecting said time base and said high speed time base to said cathode ray tube and further switch means for connecting said transducing means for mounting on a fishing vessel and on a fishing net to said pulse generator.

16. Apparatus as claimed in claim 15, wherein said further switch means also enables soundings to be effected simultaneously from the transducing means for mounting on a fishing vessel and from the transducing means for mounting on a fishing net.

References Cited in the file of this patent

UNITED STATES PATENTS

| | | |
|---|---|---|
| 2,416,320 | Jeanne | Feb. 25, 1947 |
| 2,419,541 | De Rosa | Apr. 29, 1947 |
| 2,426,989 | De Rosa | Sept. 9, 1947 |
| 2,454,782 | De Rosa | Nov. 30, 1948 |
| 2,460,316 | Trent et al. | Feb. 1, 1949 |
| 2,474,219 | Busignies | June 28, 1949 |
| 2,475,707 | Jeanne | July 12, 1949 |
| 2,644,156 | Schneider | June 30, 1953 |
| 2,757,354 | Bolzmann | July 31, 1956 |
| 2,765,565 | Mussio | Oct. 9, 1956 |
| 2,788,509 | Bolzmann | Apr. 9, 1957 |